US012036606B2

(12) United States Patent
Song et al.

(10) Patent No.: US 12,036,606 B2
(45) Date of Patent: Jul. 16, 2024

(54) HYDROTHERMAL-ASSISTED TRANSIENT JET FUSION ADDITIVE MANUFACTURING

(71) Applicant: University of Iowa Research Foundation, Iowa City, IA (US)

(72) Inventors: Xuan Song, Iowa City, IA (US); Fan Fei, Iowa City, IA (US); Levi J. Kirby, Iowa City, IA (US)

(73) Assignee: University of Iowa Research Foundation, Iowa City, IA (US)

( * ) Notice: Subject to any disclaimer, the term of this patent is extended or adjusted under 35 U.S.C. 154(b) by 211 days.

(21) Appl. No.: 17/103,430

(22) Filed: Nov. 24, 2020

(65) Prior Publication Data

US 2021/0154742 A1 May 27, 2021

Related U.S. Application Data

(60) Provisional application No. 62/940,992, filed on Nov. 27, 2019.

(51) Int. Cl.
*B22F 10/50* (2021.01)
*B28B 1/00* (2006.01)
(Continued)

(52) U.S. Cl.
CPC .............. *B22F 10/50* (2021.01); *B28B 1/001* (2013.01); *B33Y 10/00* (2014.12); *B33Y 70/00* (2014.12);
(Continued)

(58) Field of Classification Search
CPC ..................................................... B28B 1/001
See application file for complete search history.

(56) References Cited

U.S. PATENT DOCUMENTS

2017/0297108 A1\* 10/2017 Gibson ................... B22F 10/40
2017/0297109 A1\* 10/2017 Gibson ..................... B22F 3/22
(Continued)

OTHER PUBLICATIONS

Chen, Rheological behavior of titania ink and mechanical properties of titania ceramic structures by 3D direct ink writing using high solid loading titania ceramic ink, 2018, Journal of Alloys and Compounds, p. 321-328, available at https://doi.org/10.1016/j.jallcom.2018.12.334 (Year: 2018).\*
(Continued)

*Primary Examiner* — Xiao S Zhao
*Assistant Examiner* — Nicholas J Chidiac
(74) *Attorney, Agent, or Firm* — Schwegman Lundberg & Woessner, P.A.

(57) ABSTRACT

Various embodiments of the present disclosure provide an additive manufacturing method. The method includes forming a first layer of a first ceramic material and forming a second layer of a second ceramic material. The method further includes contacting the first layer of the first ceramic material, the second layer of the second ceramic material, or both with a saturant. The method further includes heating the first layer of the first ceramic material, the second layer of the second ceramic material, or both to a temperature in a range of from about 50° C. to about 300° C. The method further includes applying pressure to the first layer of the first ceramic material, the second layer of the second ceramic material, or both. The pressure can be in a range of from about 10 kPa to about 800 MPa. The method further includes at least partially dissolving a portion of an external surface of a ceramic particle of the first layer of the first ceramic material, the second layer of the second ceramic material, or both. The method further includes fusing a portion of the dissolved portion of the external surface of the ceramic particle to from a product having a density in a
(Continued)

range of from about 65% to about 100% relative to a corresponding fully densified product and optionally containing no organic binder.

11 Claims, 8 Drawing Sheets

(51) Int. Cl.
 B33Y 10/00 (2015.01)
 B33Y 70/00 (2020.01)
 B33Y 80/00 (2015.01)
(52) U.S. Cl.
 CPC ......... *B33Y 80/00* (2014.12); *B22F 2302/105* (2013.01); *B22F 2302/253* (2013.01); *B22F 2302/256* (2013.01); *B22F 2302/45* (2013.01)

(56) References Cited

U.S. PATENT DOCUMENTS

| | | | | |
|---|---|---|---|---|
| 2019/0198245 | A1* | 6/2019 | Sanner | C04B 35/634 |
| 2019/0248707 | A1* | 8/2019 | Bouville | C04B 35/622 |
| 2020/0094523 | A1* | 3/2020 | Bajaj | B32B 7/12 |
| 2021/0101839 | A1* | 4/2021 | Gogotsi | C04B 35/56 |
| 2024/0017323 | A1* | 1/2024 | Schaper | B33Y 10/00 |

OTHER PUBLICATIONS

Assaedi, H, et al., "Effect of nano-clay on mechanical and thermal properties of geopolymer", Journal of Asian Ceramic Societies, 4(1), (2016), pp. 19-28.
Atkinson, H, et al., "Fundamental aspects of hot isostatic pressing: an overview", Metallurgical and Materials Transactions A, 31(12), (2000), pp. 2981-3000.
Bai, Yun, et al., "Binder Jetting Additive Manufacturing With a Particle-Free Metal Ink as a Binder Precursor", Materials and Design 147 (2018) at www.elsevier.com/locate/matdes, 146-156.
Bourell, D L, et al., "Selective laser sintering of metals and ceramics", International Journal of Powder Metallurgy (Princeton, New Jersey), 28(4), (1992), pp. 369-381.
Gonzalez, J, et al., "Characterization of ceramic components fabricated using binder jetting additive manufacturing technology", Ceramics International, 42(9), (2016), pp. 10559-10564.
Grau, J, et al., "High green density ceramic components fabricated by the slurry-based 3DP process", 1997 International Solid Freeform Fabrication Symposium., (1997).
Griffith, M L, et al., "Freeform fabrication of ceramics via stereolithography", Journal of the American Ceramic Society, 79(10), (1996), pp. 2601-2608.
Guo, Hanzheng, et al., "Cold Sintering Process: A Novel Technique for Low-Temperature Ceramic Processing of Ferroelectrics", Journal Am. Ceram. Soc., 99 DOI 10-1.11, 2016, (2016), 3489-3507.
He, L, et al., "Support-Free Ceramic Stereolithography of Complex Overhanging Structures Based on an Elasto-viscoplastic Suspension Feedstock", ACS applied materials & interfaces, (2019).
He, L, et al., "Supportability of a High-Yield-Stress Slurry in a New Stereolithography-Based Ceramic Fabrication Process", JOM, 70(3), (2018), 407-412.

Huang, X, "Fabrication of Y2O3 transparent ceramics by hot isostatic pressing from precipitated nanopowders", Optical Materials, 92, (2019), pp. 359-365.
Jing, Guo, et al., "Cold Sintering: A Paradigm Shift for Processing and Integration of Ceramics", (Aug. 11, 2016), 5 pgs.
Kruth, J P, et al., "Binding mechanisms in selective laser sintering and selective laser melting", Rapid prototyping journal, 11(1), (2005), pp. 26-36.
Kumar, A Y, et al., "The effects of Hot Isostatic Pressing on parts fabricated by binder jetting additive manufacturing", Additive Manufacturing, 24, (2018), pp. 115-124.
Kunchala, Pragnya, et al., "3D Printing High Density Ceramics Using Binder Jetting With Nanoparticle Densifiers", Materials and Design, homepage: www.elsevier.com/locate/matdes Materials and Design 155 (2018), (2018), 443-450.
Li, W, et al., "Effects of Ceramic Density and Sintering Temperature on the Mechanical Properties of a Novel Polymer-Infiltrated Ceramic-Network Zirconia Dental Restorative (Filling) Material", Medical science monitor: international medical journal of experimental and clinical research, 24, (2018), p. 3068.
Manogharan, G, et al., "Binder jetting: a novel solid oxide fuel-cell fabrication process and evaluation", Jom, 67(3), (2015), pp. 660-667.
Matsubara, M, et al., "Sintering and piezoelectric properties of potassium sodium niobate ceramics with newly developed sintering aid", Japanese journal of applied physics, 44(1R), (2005), p. 258.
Moon, J, et al., "Ink-jet printing of binders for ceramic components", Journal of the American Ceramic Society, 85(4), (2002), pp. 755-762.
Rabinskiy, L N, et al., "Binder Jetting of Si3N4 Ceramics with Different Porosity", Solid State Phenomena, Trans Tech Publ, (2017), pp. 37-50.
Shi, Y, et al., "Enhancing copper infiltration into alumina using spark plasma sintering to achieve high performance Al2O3/Cu composites", Ceramics International, 44(1), (2018), pp. 57-64.
Sing, S L, et al., "Direct selective laser sintering and melting of ceramics: a review", Rapid Prototyping Journal, 23(3), (2017), pp. 611-623.
Vogt, U, et al., "Improving the properties of ceramic foams by a vacuum infiltration process", Journal of the European Ceramic Society, 30(15), (2010), pp. 3005-3011.
Wu, H, et al., "Effect of the particle size and the debinding process on the density of alumina ceramics fabricated by 3D printing based on stereolithography", Ceramics International, 42(15), (2016), pp. 17290-17294.
Yamasaki, N., et al., "A Hydrothermal Hot-Pressing Method: Apparatus and Application", Journal of Materials Science Letters 5, 1986., (1986), 355-356.
Zhang, H, et al., "Preparation of transparent MgO· 1.8 Al2O3 spinel ceramics by aqueous gelcasting, presintering and hot isostatic pressing,", Journal of the European Ceramic Society, 38(11), (2018), pp. 4057-4063.
Zhao, H, "3D Printing of ZrO2 Ceramic using Nano-zirconia Suspension as a Binder", 2015 4th International Conference on Sensors, Measurement and Intelligent Materials, Atlantis Press., (2016).
Zocca, A, et al., "Additive manufacturing of ceramics: issues, potentialities, and opportunities", Journal of the American Ceramic Society 98(7), (2015), pp. 1983-2001.

* cited by examiner

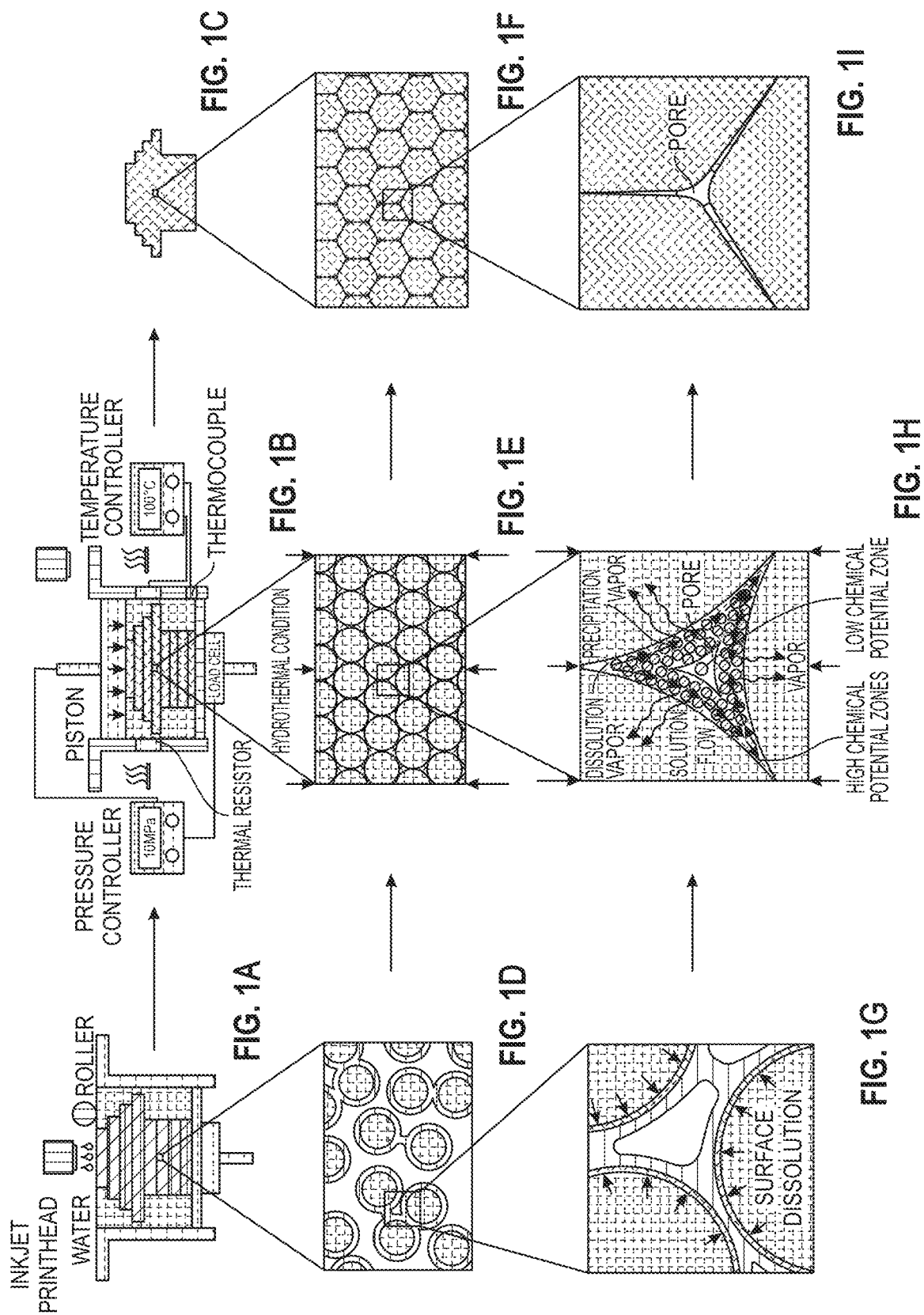

HYDROTHERMAL-ASSISTED TRANSIENT JET FUSION ADDITIVE MANUFACTURING

CROSS-REFERENCE TO RELATED APPLICATION

This application claims the benefit of priority to U.S. Provisional Patent Application Ser. No. 62/940,992 entitled "HYDROTHERMAL-ASSISTED TRANSIENT JET FUSION ADDITIVE MANUFACTURING," filed Nov. 27, 2019, the disclosure of which is incorporated herein in its entirety by reference.

BACKGROUND

Ceramic additive manufacturing (AM) provides a free-form fabrication method for creating complex ceramic structures that have been extremely difficult to build by traditional manufacturing processes. However, ceramic structures made by AM processes usually exhibit a relatively low density, which is largely due to the use of a large amount of organic binder in shaping green bodies.

SUMMARY OF THE INVENTION

Various embodiments of the present disclosure provide an additive manufacturing method. The method includes forming a first layer of a first ceramic material and forming a second layer of a second ceramic material. The method further includes contacting the first layer of the first ceramic material, the second layer of the second ceramic material, or both with a saturant. The method further includes heating the first layer of the first ceramic material, the second layer of the second ceramic material, or both to a temperature in a range of from about 50° C. to about 300° C. The method further includes applying pressure to the first layer of the first ceramic material, the second layer of the second ceramic material, or both. The pressure can be in a range of from about 0 Pa to about 800 MPa. The method further includes at least partially dissolving a portion of an external surface of a ceramic particle of the first layer of the first ceramic material, the second layer of the second ceramic material, or both. The method further includes fusing a portion of the dissolved portion of the external surface of the ceramic particle to form a product having a density in a range of from about 65% to about 100% relative to a corresponding fully densified product and optionally containing no organic binders.

Various embodiments of the present disclosure further provide a product formed by an additive manufacturing method. The method includes forming a first layer of a first ceramic material and forming a second layer of a second ceramic material. The method further includes contacting the first layer of the first ceramic material, the second layer of the second ceramic material, or both with a saturant. The method further includes heating the first layer of the first ceramic material, the second layer of the second ceramic material, or both to a temperature in a range of from about 50° C. to about 300° C. The method further includes applying pressure to the first layer of the first ceramic material, the second layer of the second ceramic material, or both. The pressure can be in a range of from about 0 Pa to about 800 MPa. The pressure can be applied as the layers are heated or before. The method further includes at least partially dissolving a portion of an external surface of a ceramic particle of the first layer of the first ceramic material, the second layer of the second ceramic material, or both. The method further includes fusing a portion of the dissolved portion of the external surface of the ceramic particle to from a product having a density in a range of from about 65% to about 100% relative to a corresponding fully densified product and optionally containing no organic binders.

Various embodiments of the present disclosure further provide an additive manufacturing product. The product includes a first layer of a first ceramic material and a second layer of a second ceramic material adjacent to the first layer. The product further includes an interface between the first layer and the second layer comprising fused first ceramic material and second ceramic material. A density of the product is in a range of from about 65% to about 100% relative to a corresponding fully densified product and optionally containing no organic binders.

BRIEF DESCRIPTION OF THE FIGURES

The drawings illustrate generally, by way of example, but not by way of limitation, various embodiments of the present invention.

FIGS. 1A-1I are schematic illustrations of an additive manufacturing process, FIGS. 1A, 1B, and 1C together show the overall additive manufacturing process, FIGS. 1D and 1G show zoomed schematic views of the product being formed at FIG. 1A; FIGS. 1E and 1H show zoomed schematic views of the product being formed at FIG. 1B; and FIGS. 1F and 1I show zoomed schematic views of the product formed at FIG. 1C, in accordance with various embodiments.

DETAILED DESCRIPTION OF THE INVENTION

Figure 2A:
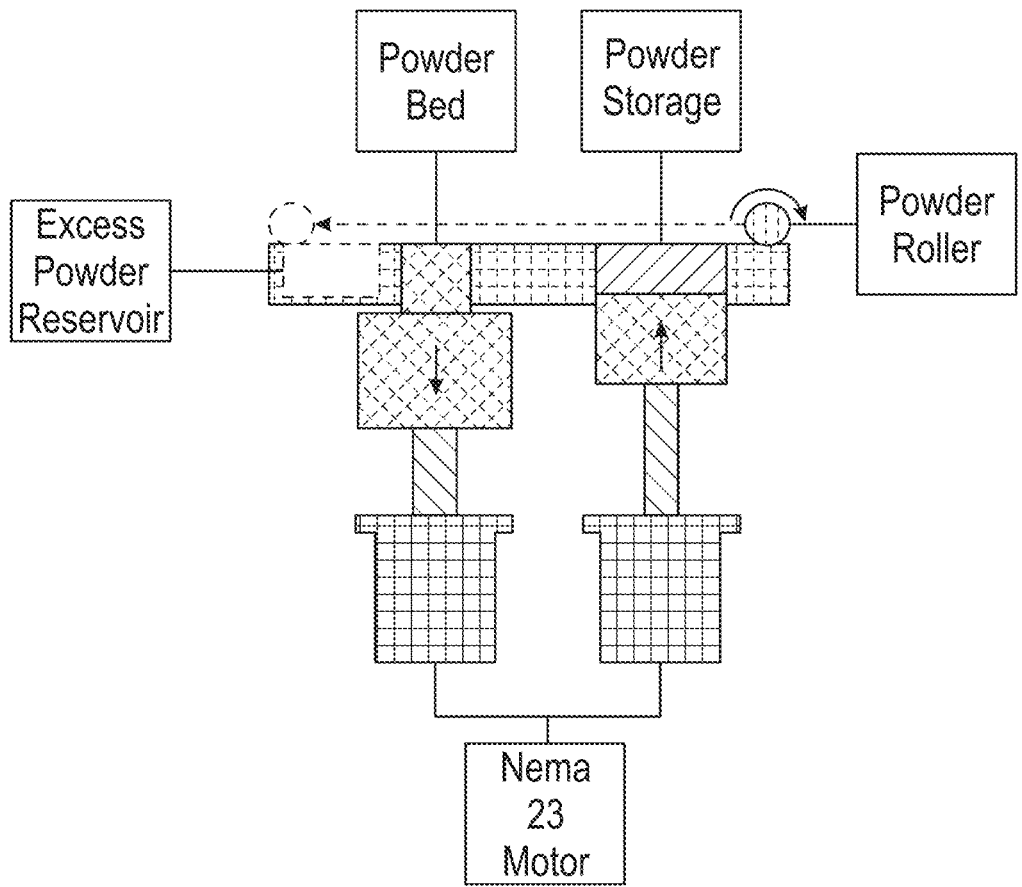
FIGS. 2A-2C are schematic illustrations of an apparatus for performing the additive manufacturing process, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" or "at least one of A or B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range. The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%. The term "substantially free of" as used herein can mean having none or having a trivial amount of, such that the amount of material present does not affect the material properties of the composition including the material, such that about 0 wt % to about 5 wt % of the composition is the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less, or about 0 wt %.

The term "organic group" as used herein refers to any carbon-containing functional group. Examples can include an oxygen-containing group such as an alkoxy group, aryloxy group, aralkyloxy group, oxo(carbonyl) group; a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, C(=NOR)R, and substituted or unsubstituted (C$_1$-C$_{100}$)hydrocarbyl, wherein R can be hydrogen (in examples that include other carbon atoms) or a carbon-based moiety, and wherein the carbon-based moiety can be substituted or unsubstituted.

The term "substituted" as used herein in conjunction with a molecule or an organic group as defined herein refers to the state in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, and C(=NOR)R, wherein R can be hydrogen or a carbon-based moiety; for example, R can be hydrogen, (C$_1$-C$_{100}$)hydrocarbyl, alkyl, acyl, cycloalkyl, aryl, aralkyl, heterocyclyl, heteroaryl, or heteroarylalkyl; or wherein two R groups bonded to a nitrogen atom or to adjacent nitrogen atoms can together with the nitrogen atom or atoms form a heterocyclyl.

The term "hydrocarbon" or "hydrocarbyl" as used herein refers to a molecule or functional group that includes carbon and hydrogen atoms. The term can also refer to a molecule or functional group that normally includes both carbon and hydrogen atoms but wherein all the hydrogen atoms are substituted with other functional groups. The term "hydrocarbyl" refers to a functional group derived from a straight chain, branched, or cyclic hydrocarbon, and can be alkyl, alkenyl, alkynyl, aryl, cycloalkyl, acyl, or any combination thereof. Hydrocarbyl groups can be shown as (C$_a$-C$_b$)hydrocarbyl, wherein a and b are integers and mean having any of a to b number of carbon atoms. For example, (C$_1$-C$_4$) hydrocarbyl means the hydrocarbyl group can be methyl (C$_1$), ethyl (C$_2$), propyl (C$_3$), or butyl (C$_4$), and (C$_0$-C$_b$) hydrocarbyl means in certain embodiments there is no hydrocarbyl group. A hydrocarbylene group is a diradical hydrocarbon, e.g., a hydrocarbon that is bonded at two locations.

Described herein is an additive manufacturing method to form a product having a high density and containing no organic binder. The additive manufacturing method generally includes depositing a plurality of layers of materials, contacting the layers with a saturant, heating the layers, and applying pressure to the layers. The additive manufacturing methods can be free of including a binder within or between layers.

According to various examples of the present disclosure a ceramic part can be additively manufactured according to the disclosed methods by using the disclosed system.

Additive manufacturing (AM) fabricates a product directly from a Computer Aided Design (CAD) model regardless of geometric complexity. Examples of additive manufacturing processes for ceramic fabrication include extrusion freeform fabrication (EFF), Stereolithography (SLA), binder/ink jetting, and Selective Laser Sintering (SLS). Among these processes, SLA, as an example, can produce better resolution and higher density can be achieved in final ceramic part production. Generally, an SLA process involves filling a tank with photosensitive resin, which solidifies once exposed to UV light; a dynamic digital image (or a laser dot) is projected onto the liquid surface to solidify the resin layer by layer.

When employed to fabricate ceramics, SLA can function in the same manner as polymer fabrication, however, the feedstock material is changed from pure photocurable resin to a mixture of ceramic powders and resin. It can sometimes be helpful in fabrication of ceramic parts with SLA to include a ceramic-polymer composite support structure (also called green part). After formation of the ceramic part, the green part is de-binded and sintered through a heat-treatment process, during which the polymer in the composite part is removed and the remaining ceramic particles are consolidated into pure ceramic compacts.

As an example of a suitable additive manufacturing method, a first layer of a first ceramic material can be deposited in accordance with the CAD model on a substrate or platform of an additive manufacturing machine. The deposited layer can be optionally leveled with a device such as a blade or roller. The substrate or platform can then be moved in any of an x-direction, y-direction, z-direction, or any combination thereof. For example, after the first layer of the first ceramic material is deposited, the platform or substrate can be moved down in the z-direction to allow a second layer of a second ceramic material to be deposited on top of the first layer of the ceramic material. This process can be repeated any amount of times depending on the amount of layers needed to form a final product. Each layer can have a thickness, for example, in a range of from about 100 µm to about 900 µm, about 300 µm to about 600 µm, less than, equal to, or greater than about 100 µm, 150, 200, 250, 300, 350, 400, 450, 500, 550, 600, 650, 700, 750, 800, 850, or about 900 µm.

The ceramic material of each layer can be chosen from many suitable inorganic complexes. The ceramic material should, however, be at least partially soluble in a solution that includes water or an organic medium. Examples of suitable ceramic materials can include vanadium oxide, fused aluminium oxide material, heat treated aluminium oxide material, sintered aluminium oxide material, silicon carbide material, titanium diboride, boron carbide, tungsten carbide, titanium carbide, cubic boron nitride, garnet, fused alumina-zirconia, cerium oxide, zirconium oxide, titanium oxide, silica, barium titanate, calcium phosphate, or mixtures thereof. Each layer can include the same ceramic material or each layer (or a subset of layers) can include different ceramic materials. The ceramic material in each layer can include a plurality of ceramic grains. In each layer the ceramic grains can have substantially the same morphology (e.g., largest dimension, profile, or aspect ratio). Alternatively, in each layer the ceramic grains can have substantially different morphologies.

As each layer of ceramic material is deposited, a saturant is applied to the layer. The saturant can be a liquid that includes water or an organic material. If the saturant is water, it can be deionized water. It is possible for the water to include no additional constituents, but it is also possible for the water to include constituents such as glycerine, lactam, glycol, or a mixture thereof. It is also possible for the saturant to include any desired dopant material. If the saturant is an organic material, the organic material can be any number of suitable materials that can at least partially dissolve the ceramic material. Suitable organic materials can include a substituted or unsubstituted $(C_1-C_{20})$hydrocarbyl.

The saturant can be applied to each ceramic layer as it is deposited or shortly thereafter. Alternatively, the saturant can be applied to after all or a subset of the ceramic layers are deposited. Following application, the saturant is able to infiltrate the gaps or pores between the ceramic grains in each layer of ceramic material. Thus, in some examples, each grain of ceramic material can be at least partially encapsulated by the saturant. On a per-layer basis, the saturant is independently in a range of from about 0.5 wt % to about 50 wt % of each layer, about 1 wt % to about 10 wt %, or less than, equal to, or greater than about 0.5 wt %, 1, 5, 10, 15, 20, 25, 30, 35, 40, 45, or about 50 wt %.

Owing to the partial solubility of the ceramic material in the presence of the saturant, at least a portion of the ceramic material in the ceramic grains dissolves into the saturant. The degree to which the ceramic grains dissolve can be a factor, for example, of the amount of time that the ceramic grains are exposed to the saturant or the types of additives that may be present in the saturant. For example, the degree to which the ceramic grains are dissolved can be increased by making the saturant slightly acidic. The degree to which the ceramic material dissolves can also be a function of the ceramic material's dissolution constant in the saturant to which it is exposed.

Having dissolved ceramic material present in the pores and spaces between the ceramic grains presents the opportunity to fuse the ceramic material throughout the product to be formed. Fusion can be achieved by heating and pressuring the layers of ceramic materials. With respect to temperature, the layers with saturant can be heated to a temperature at or near the saturant's boiling point. For example, the saturant can be heated to a temperature in a range of from about 50° C. to about 300° C., about 70° C. to about 140° C., about 80° C. to about 100° C., less than, equal to, or greater than about 50° C., 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, or about 300° C. Heating the saturant causes it to begin to evaporate leaving the dissolved ceramic material to fall out of solution and clog the space between the ceramic grains. Applying pressure can help to compress the gaps between the ceramic grains thereby compressing the ceramic particles between the grains, thus causing fusion. The pressure to which the ceramic layers are exposed can be in a range of from about 10 kPa to about 800 MPa, 150 MPa to about 700 MPa, about 200 Mpa to about 500 Mpa, less than, equal to, or greater than about 10 kpa, 50 Mpa, 100 Mpa, 150 Mpa, 200 Mpa, 250 Mpa, 300 Mpa, 350 Mpa, 400 Mpa, 450 Mpa, 500 Mpa, 550 Mpa, 600 Mpa, 650 Mpa, 700 Mpa, 750 Mpa, or about 800 Mpa. The pressure can be applied through various techniques such as by applying a press downward in the z-direction.

The temperature and pressure can be applied to the ceramic layers by external apparatuses. However, in some examples, an additive manufacturing machine can be configured to perform each of these operations. For example, an additive manufacturing machine can include a chamber with a platform configured to move in a z-direction. An ink jet head can be positioned over the platform to deposit the ceramic material and saturant. After the ceramic material and saturant is applied, the platform can move down in the z-direction to a chamber. This process can be repeated for each layer. The chamber can be lined with or in thermal communication with several thermal elements such as thermal resistors. Heat applied through the chamber can act to evaporate the saturant as described herein. Heating and pressure application can occur simultaneously or separately. The heating and pressure application can occur over any suitable amount of time. For example, heating and pressure application can independently occur over a timespan in a range of from about 0.1 hours to about 10 hours, about 0.5 hours to about 2 hours, or less than, equal to, or greater than about 0.1 hours, 0.5, 1, 1.5, 2, 2.5, 3, 3.5, 4, 4.5, 5, 5.5, 6, 6.5, 7, 7.5, 8, 8.5, 9, 9.5, or about 10 hours.

The fusion of the ceramic materials helps to form dense additively manufactured products. For example, as a result of the fusing in the pores and spaces between the ceramic material, a density of the parts formed through these additive manufacturing techniques can be in a range of from about 65% to about 100% relative to fully densified (e.g., containing no pores or openings) product, about 80% to about 95%, less than, equal to, or greater than about 65%, 70, 75, 80, 85, 90, 95, or about 100%. The high degree of density on the products formed by the additive manufacturing techniques described herein have several advantages relative to product formed by other additive manufacturing techniques that do not include, exposure to a saturant, exposure to heat, exposure to pressure, or a combination thereof. For example, the products formed according to the instant additive manufacturing techniques are stronger. Also as a further example, the relative absence of pores can help to prevent deformations in the product because there is less internal empty space in the product for the layers to collapse into. Also fusing the ceramic layers as described can allow for the product to be manufactured without using a binder or adhesive in the product. Not using a binder or adhesive can make the manufacturing process easier and more efficient. Also in some examples, the product may not need to be subjected to any pos-processing densification steps, but these steps may be optionally carried out if desired.

EXAMPLES

Various embodiments of the present invention can be better understood by reference to the following Examples which are offered by way of illustration. The present invention is not limited to the Examples given herein.

Example 1

1.1 Materials

In this example, vanadium oxide ($V_2O_5$, 98%, Sigma-Aldrich, St. Louis, USA) was selected as a model material, which is an inorganic compound widely used as industrial catalyst and thermal resistant materials. The particle size of the material was 1 μm, and the melting point was 690° C. The powder exhibited a partial solubility in water, which enabled the selective consolidation of the material in the proposed additive manufacturing process. To improve the powder flowability for coating layers with smaller thickness, the raw $V_2O_5$ powders were first mixed with an ethanol solution and washed in an ultrasound bath. The mixed powders were then dried and ground into fine powders using a mortar and pestle. This powder preparation method reduced the agglomerates in the raw $V_2O_5$ powder and allowed for coating particle layers with a small layer thickness, e.g., 100 μm, in contrast to 500 μm achieved with the raw powder.

Distilled (DI) water and a commercial aqueous saturant (PG-243, Canon) were used as transient solutions, which fuse ceramic nanoparticles through a mediated dissolution-diffusion-precipitation process under the transient evaporation of the solvent. The aqueous saturant was composed of 60-80% water, 5-10% Glycerin, 5-10% Lactam, and 5-10% Glycol.

1.2 Fabrication Process

The exemplified additive manufacturing process involved three major steps to achieve a green part with high density, including transient solution deposition, hydrothermal pressing and ultrasonic elimination, as shown in FIG. 1. An inkjet 3D printer was used to selectively deposit a transient aqueous solution into a ceramic powder bed in a target 3D shape. The ceramic nanoparticles in the powder bed, including the transient-solution-wetted nanoparticles and dry nanoparticles, were then compacted under a controlled hydrothermal environment applied via a uniaxial press. A 3D object with the target shape (e.g., green part) was obtained after ultrasonic cleaning. Finally, the green part was optionally densified through post-consolidation processes, such as furnace sintering. The three steps used to create green parts are discussed in detail in the following sections.

1.3 Inkjet-Printing-Based Transient Solution Deposition

Figure 2B:
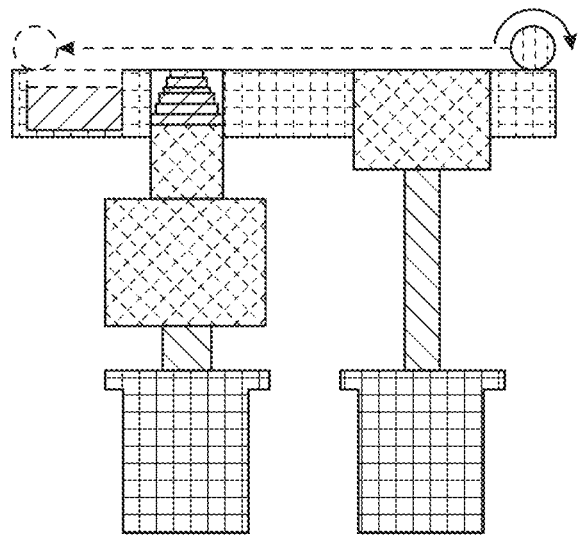
Figure 2C:
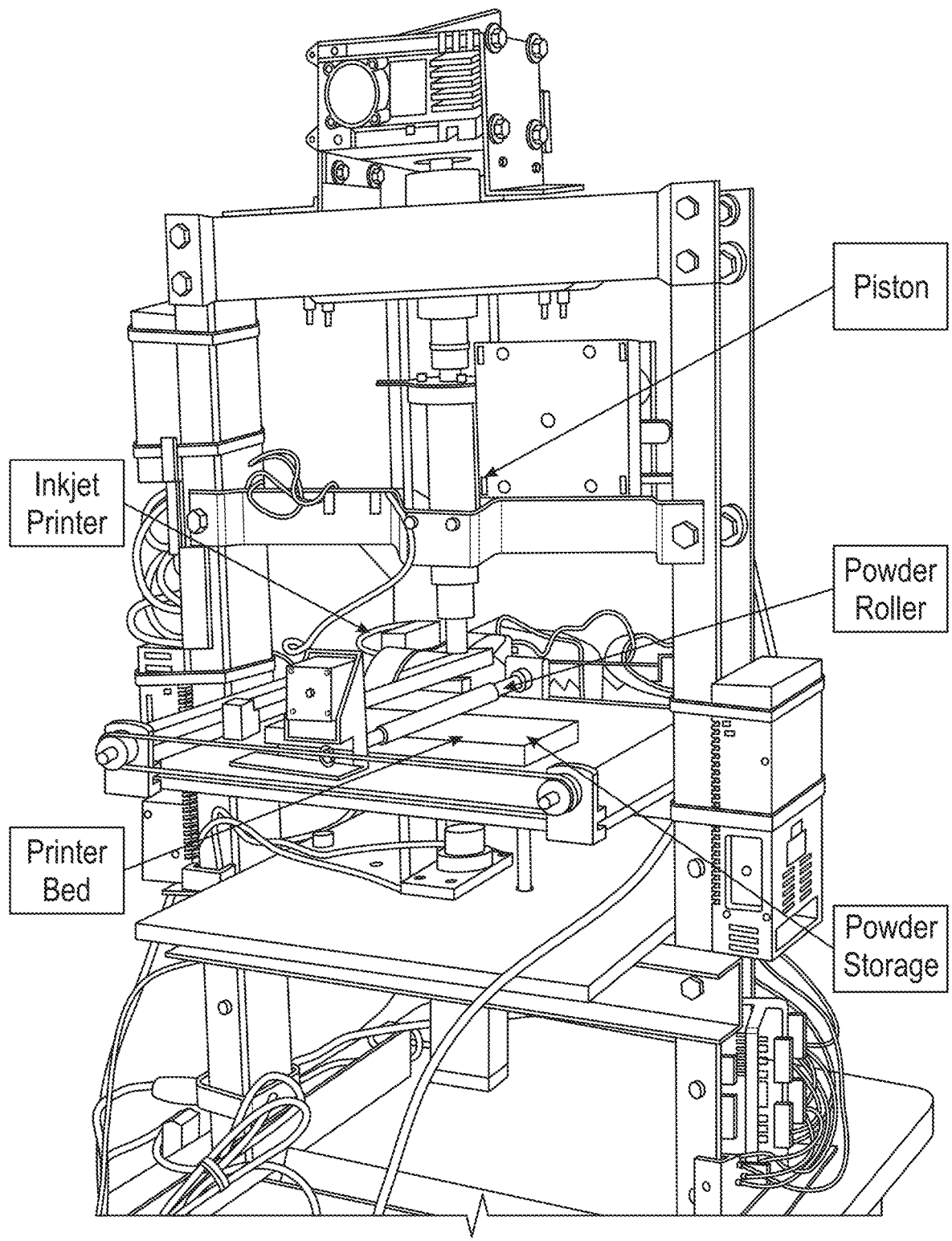

A hydrothermal inkjet 3D printer was developed to selectively deposit a transient solution in ceramic powder bed. A prototype system is shown in FIG. 2. The system was composed of a building platform, a powder reservoir, a powder feeding roller and an inkjet printhead dissected from a Canon inkjet printer. A belt-pulley mechanism was used to move the inkjet printhead and the roller along the x-axis. The building platform and the powder reservoir were controlled independently by a z-axis linear actuator. On initialization of the fabrication, the following steps occurred: (1) the building platform moved down a distance of d (d is the layer thickness, e.g., 200 μm); (2) the powder reservoir moved up a certain distance to feed ceramic nanoparticles into the working area; (3) the roller rotated counterclockwise and moved from left to right to spread a thin layer of ceramic nanoparticles on top of the building platform; the packing density of the fresh layer can be further increased by manual or hydraulic pressing; (4) as the inkjet printhead moved together with the roller, it deposited a transient solution with a predefined 2D pattern into the new layer. The amount of the deposited transient solution was controlled by repeating step (4) with different numbers of printing passes. These steps were repeated until the whole part was completed. Finally, a pressure and temperature were applied to the deposited layers to induce the fusion among particles.

1.5 Analysis of Process Parameters

Various process parameters associated with the additive manufacturing process are given in Table 1.

TABLE 1

Process parameters in the additive manufacturing process.

| Process parameter | Explanation |
| --- | --- |
| Layer thickness | The thickness of each layer |
| Print pass | The printing times of the same pattern in each layer |

TABLE 1-continued

Process parameters in the additive manufacturing process.

| Process parameter | Explanation |
|---|---|
| Pre-press pressure | The pressure applied to each new layer after powder coating |
| Final pressure | The pressure applied to the powder compact during hydrothermal pressing |
| Temperature | The temperature applied to the powder compact during hydrothermal pressing |
| Ink viscosity | The viscosity of the transient solution containing water and surfactant |
| Ink surface tension | The surface tension of the transient solution |

Process parameters, including layer thickness, print pass, pre-press pressure, saturant viscosity and surface tension, influence the penetration and diffusion of a deposited transient solution in the powder bed, which consequently affect the concentration of a transient solution in the powder bed. The concentration of a transient solution, on the other hand, determined the temperature and pressure required for achieving differential consolidation of wetted and dry nanoparticles. To understand the effects of process parameters on the consolidation of nanoparticles, several sample disks were made by manually mixing $V_2O_5$ powders with deionized water at different concentrations (0-30 wt %). The mixed powders were hydrothermally pressed under different final pressures (250-650 MPa) and temperatures (120° C. and 140° C.). Scanning electron microscopy (SEM) was used to study the microstructures of samples built by different process parameters. The green density of the samples was measured using ASTM C373-88.

1.6 Construction of Processing Map

As stated herein, the temperature and final pressure used in hydrothermal pressing were dependent on the concentration of a transient solution deposited in the powder compact, all of which influenced the achieved green density and strength. A processing map was constructed for selecting the proper temperature and final pressure that can fully fuse the wetted nanoparticles without influencing the dry nanoparticles. Deionized water was used as the saturant or transient solution and mixed the powder with water at a constant water concentration, e.g., 10 wt %. The mixed powder was hydrothermally pressed under pressures ranging from 12.5 MPa to 50 MPa and temperatures from 25° C. to 200° C. The achieved ceramic compacts were smashed in ethanol in an ultrasound cleaner for 15 minutes before the morphology of the compacts was evaluated (e.g., full disk, partially smashed or completely smashed).

1.7 Fusion Mechanisms

Figure 7A:
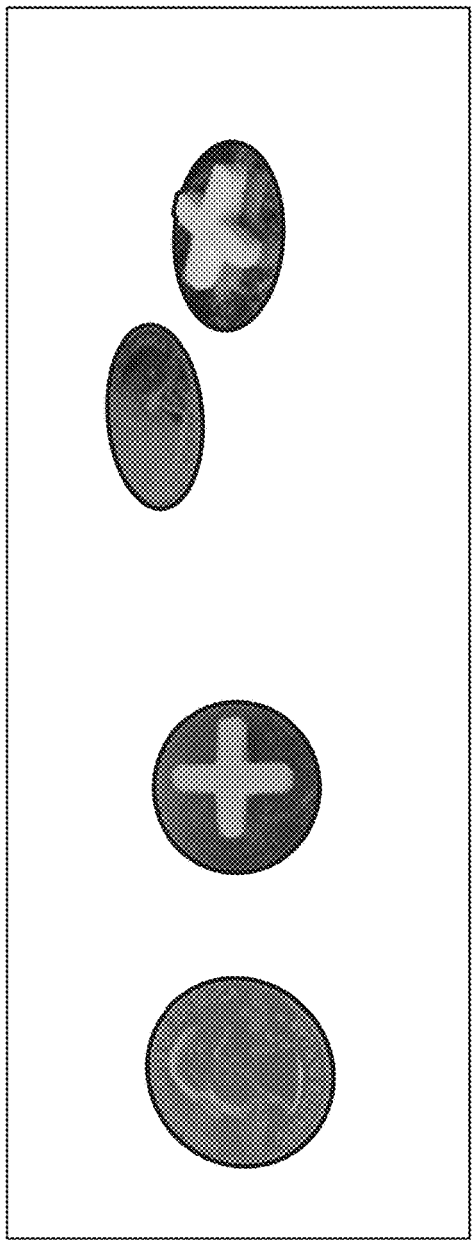
FIGS. 7A-7B are sets of photographs showing further products formed using the additive manufacturing processes described herein.
Figure 7B:
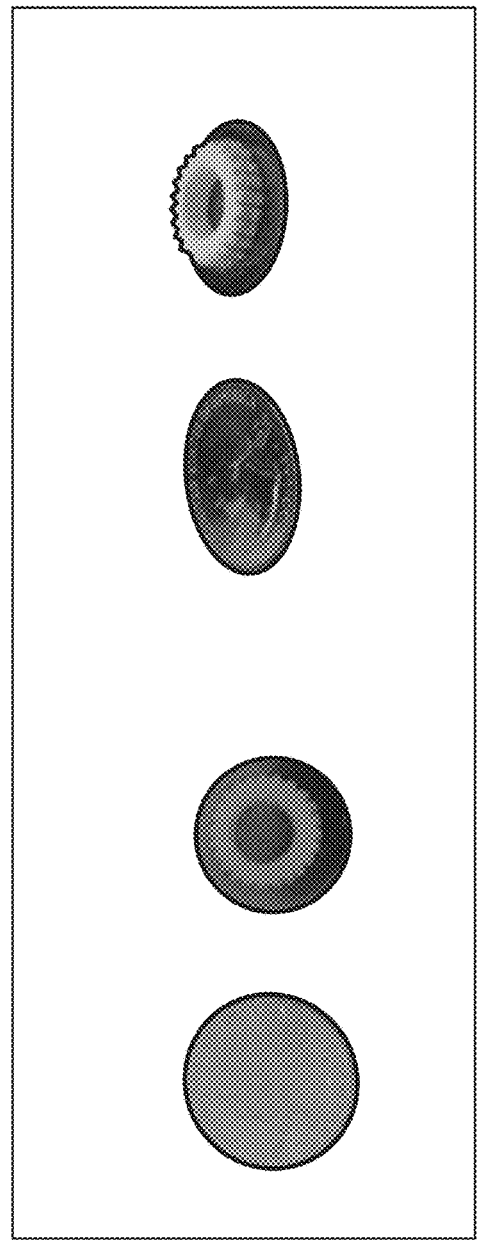

In the proposed additive manufacturing process, ceramic nanoparticles in the powder bed were selectively fused by controlling the deposition of a water-based transient solution. Under a proper hydrothermal environment, nanoparticles wetted by the transient solution could be fused, while the dry nanoparticles remained loose. The exact mechanisms governing this water-modulated consolidation of ceramic nanoparticles are not yet been well understood, but it is suspected that it can be attributed to the hydrothermal interaction between the transient solution and the nanoparticles, which mediates a dissolution-diffusion-precipitation process of mass at nanoparticle surfaces, as depicted in FIG. 1. After a transient solution, such as water, is deposited on the powder bed, as shown in FIGS. 1A, 1D, and 1G it penetrates through the top layer under gravity and capillary pressure, where nanoparticles are partially dissolved (particularly sharp edges), leading to soft nanoparticle surfaces, and small-size particles are transported into the pores between large particles. As an appropriate pressure and temperature condition is applied, as shown in FIGS. 1B, 1E, and 1H, the surface-softened nanoparticles deform, resulting in closer distances between particles and full saturation or occupation of water in interparticle pores. Due to a higher chemical potential at the contact areas between nanoparticles caused by capillary pressure, ionic species and/or atomic clusters diffuse through the water and precipitate on particle surfaces away from the stressed contact areas. As a result, pores are filled with precipitation that binds those particles together. The bonding between particles can be further enhanced by completely evaporating the residual water in the pores using an oven. Compared to other ceramic additive manufacturing processes, the instant additive manufacturing process binds particles with an evaporative solution, which transiently evaporates as a green part is formed and hence does not take up any space in green parts, enabling an increased green density. The final product formed is shown in FIGS. 1C, 1F, and 1G. FIG. 7 also shows examples of products formed according to the process depicted in FIG. 1.

1.8 Effect of Pressure on Green Density

Figure 3A:
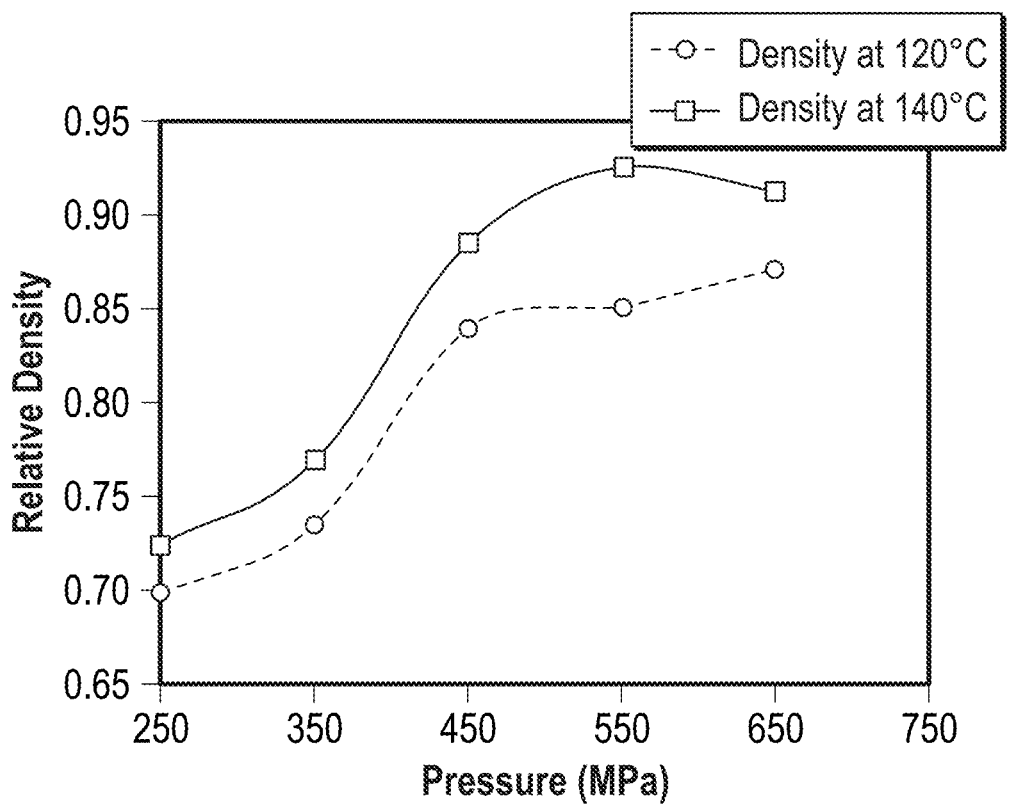
FIGS. 3A and 3B are a set of graphs showing the relative density of parts formed using the additive manufacturing techniques described herein, in accordance with various embodiments.

The effects of pressure on green density are shown in FIG. 3A. Under the same temperature, the green density increased from 70% to over 85% with the increasing final pressure. This is because a higher pressure induced a higher capillary pressure in the powder, enabling a higher chemical potential to drive the mass transport towards pores. The density reached an approximate plateau above a pressure of 450 MPa, which is determined by the degree of supersaturation of the ceramic material in water.

1.9 Effect of Temperature on Green Density

FIG. 3A shows that the green density increased by about 5% as the temperature increased from 120° C. to 140° C. An explanation for this increase is that a higher temperature leads to a higher degree of solute supersaturation and a greater evaporation rate of water, which consequently contribute to more precipitates diffused into the pores. It should be noted that the density did not increase as the temperature continued to increase. Under a temperature of 180° C., for example, the powder was not successfully fused, and the powder compact was easily smashed in ultrasound. This may be because the evaporation rate of water exceeds the rate of atomic diffusion-precipitation such that condensation of the dissolved phase stopped at sites close to the contact areas.

1.10 Effect of Water Concentration on Green Density

Figure 3B:
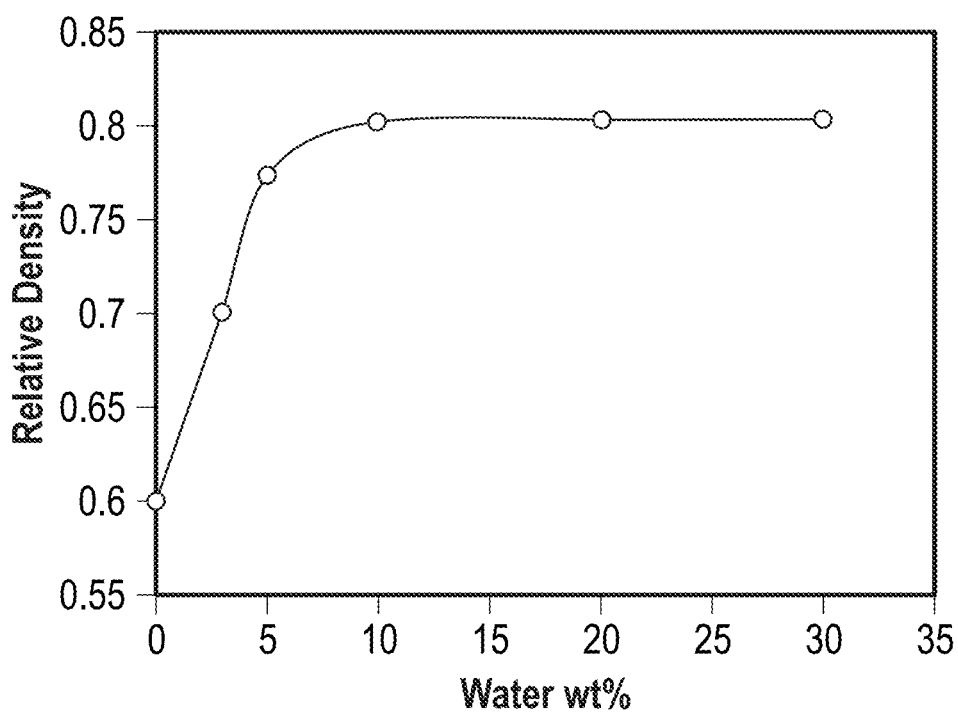

FIG. 3B shows the green density increased dramatically from 60% to 80% as the water concentration increased from 0 wt % to 10 wt %. The density of the green part obtained without adding any water (e.g., 0%) was estimated as the packing density of the powder, since the achieved green part was too fragile to measure. Similar to the results shown in FIG. 3A, the green density reached a plateau above a water concentration of 10 wt %. It was thought that is because the water concentration required for obtaining sufficient precipitates to occupy interparticle pores is related to the porosity of the powder compact under the given pressure and temperature condition; when the water concentration is greater than the porosity, all the excess water will be expelled out of the powder compact as the pressure is applied, leaving a fixed concentration of water in the interparticle pores that results in the same green density.

1.11 Microstructures of Fused Ceramics

Figure 4A:
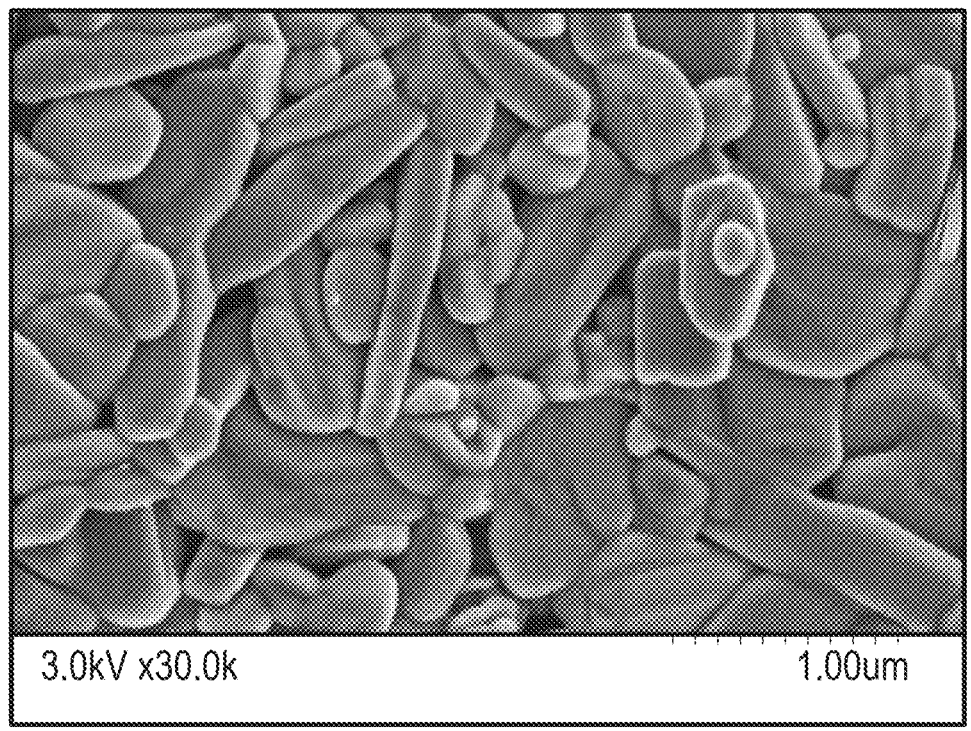
FIGS. 4A and 4B are a set of images comparing the microstructure of a ceramic powder before and after fusion during additive manufacturing, in accordance with various embodiments.
Figure 4B:
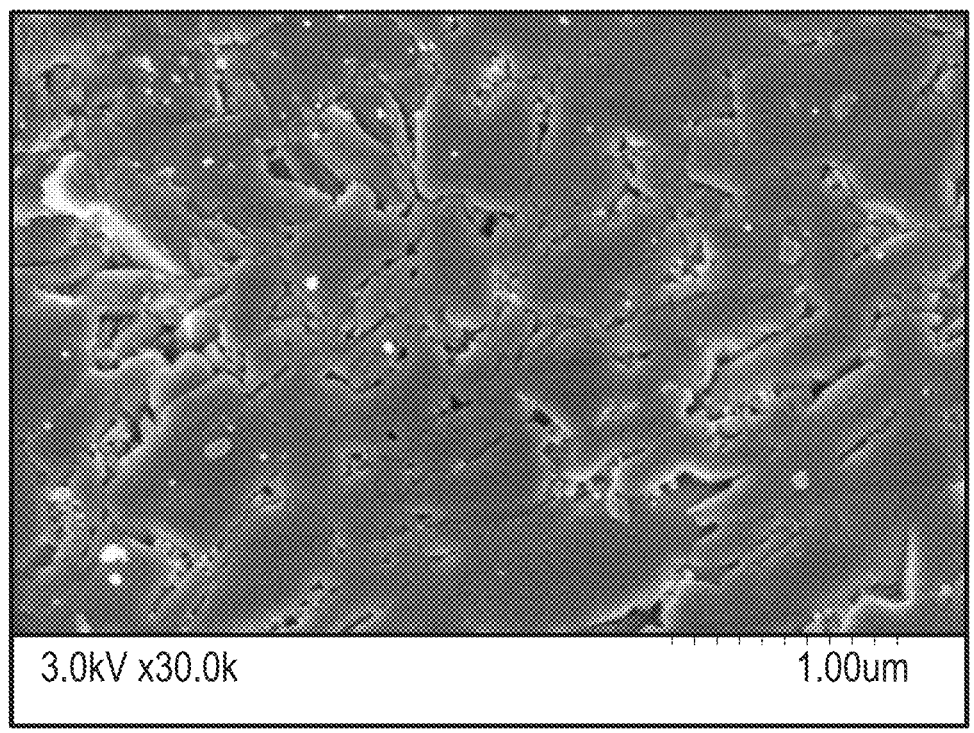

The microstructures of the as-received powder and a green part fabricated with 10 wt % water, 650 MPa and 120° C. are shown in FIGS. 4A and 4B. The SEM images show that a dense green body can be achieved via the additive manufacturing process with small porosity and sufficient strength.

1.12 Processing Map for Selective Fusion

Figure 5:
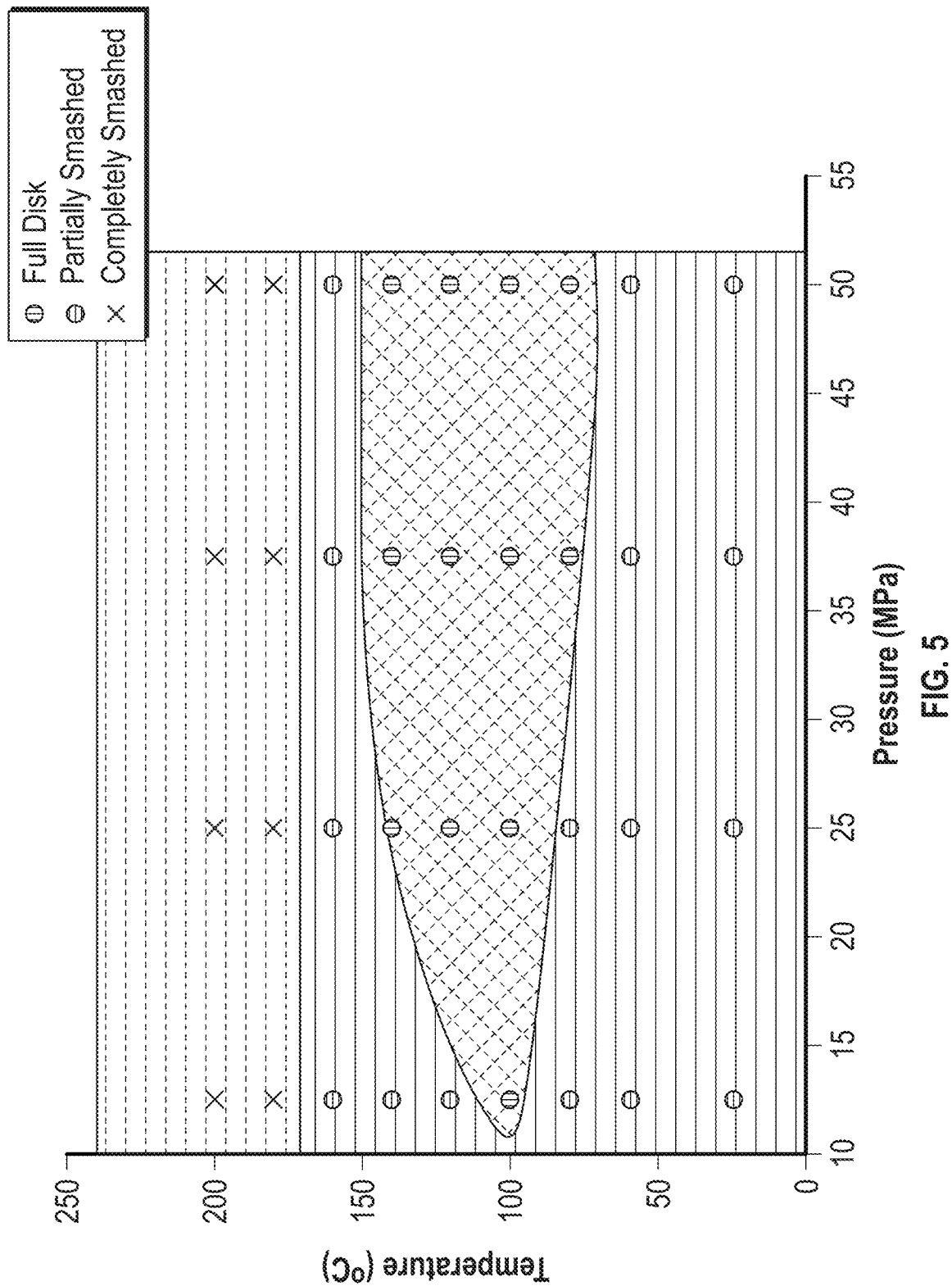
FIG. 5 is a processing map showing various parameters used during the additive manufacturing process, in accordance with various embodiments.

The processing map constructed for the water concentration of 10 wt % is given in FIG. 5. The red region depicts different combinations of temperature and final pressure that produced sufficiently strong green parts. It indicates that a green part can be obtained at a pressure as low as 12.5 MPa or a temperature as low as 80° C. The grey region denotes the process parameters that produce fragile green parts. The corresponding temperature and final pressure cannot effectively fuse the ceramic nanoparticles, which was easily smashed in the ultrasound. The blue region represents the temperatures and pressures that initialized the fusion of some nanoparticles but did not achieve sufficient strength.

1.12 Test Cases

Figure 6:
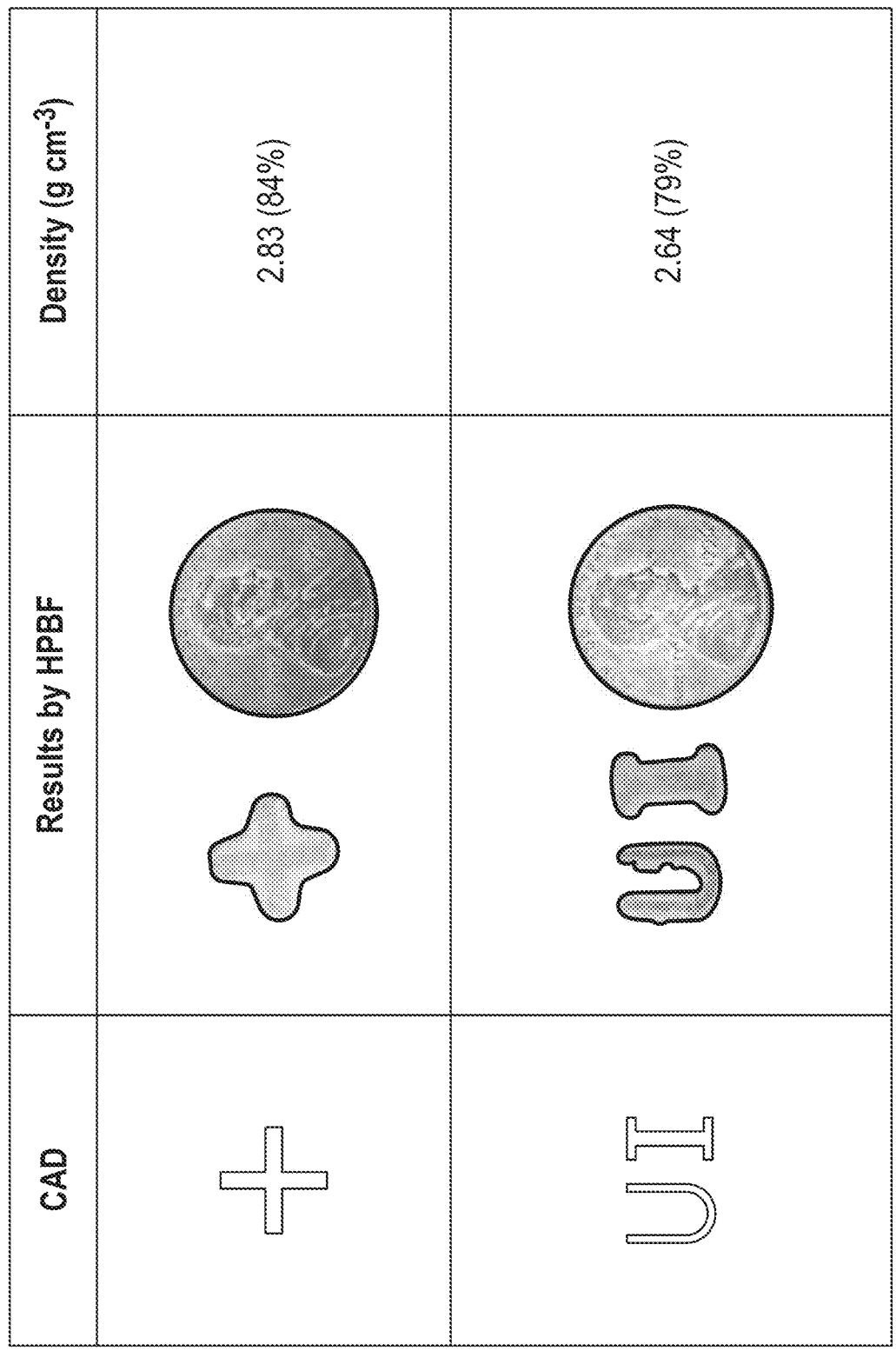
FIG. 6 is a set of photographs showing products formed using the additive manufacturing processes described herein, in accordance with various embodiments.

Several test cases were fabricated using an aqueous carbon ink as the transient solution, due to the excellent ink-jet printability in comparison to pure DI water. For transient solution deposition, layer thickness was set as 500 μm; a pre-press pressure of 25 MPa and a print pass of 15 were used for each layer. For hydrothermal pressing, final pressure and temperature were set as 350 MPa and 120° C. respectively, and the holding time was 20 min. FIG. 6 shows a cross shape and "UI" characters. The fabrication accuracy was influenced by the ink diffusion across the designed boundaries, which can be reduced by optimizing the layer thickness, pre-press and final press of the additive manufacturing process. The green densities of the achieved samples reached 84%, which are much higher than the ones reported in the literature, such as 60% by extrusion-based ceramic AM, 67% by a slurry-based binder jetting process, etc. It should be noted that the Glycol in the aqueous ink solution may play a partial role as a binder in bonding the particles. Similar procedures and parameters have also been used to fabricate lithium molybdenum oxide ($Li_2MoO_4$) components, as shown in FIG. 7.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Exemplary Embodiments

The following exemplary embodiments are provided, the numbering of which is not to be construed as designating levels of importance:

Embodiment 1 provides an additive manufacturing method, comprising:
  forming a first layer of a first ceramic material;
  forming a second layer of a second ceramic material;
  contacting the first layer of the first ceramic material, the second layer of the second ceramic material, or both with a saturant;
  heating the first layer of the first ceramic material, the second layer of the second ceramic material, or both to a temperature in a range of from about 50° C. to about 300° C.;
  applying pressure to the first layer of the first ceramic material, the second layer of the second ceramic material, or both, wherein the pressure is in a range of from about 0 Pa to about 800 MPa;
  at least partially dissolving a portion of an external surface of a ceramic particle of the first layer of the first ceramic material, the second layer of the second ceramic material, or both;
  fusing a portion of the dissolved portion of the external surface of the ceramic particle to from a product having a density in a range of from about 65% to about 100% relative to a corresponding fully densified product.

Embodiment 2 provides the additive manufacturing method of Embodiment 1, wherein the first ceramic material and the second ceramic material independently comprises vanadium oxide, fused aluminium oxide material, heat treated aluminium oxide material, sintered aluminium oxide material, silicon carbide material, titanium diboride, boron carbide, tungsten carbide, titanium carbide, cubic boron nitride, garnet, fused alumina-zirconia, cerium oxide, zirconium oxide, titanium oxide, or mixtures thereof.

Embodiment 3 provides the additive manufacturing method of any one of Embodiments 1 or 2, wherein the first ceramic material and the second ceramic material comprises different materials.

Embodiment 4 provides the additive manufacturing method of any one of Embodiments 1-3, wherein the first ceramic material and the second ceramic material comprise the same material.

Embodiment 5 provides the additive manufacturing method of any one of Embodiments 1-4, wherein the saturant comprises water.

Embodiment 6 provides the additive manufacturing method of Embodiment 5, wherein the saturant further comprises glycerine, lactam, glycol, or a mixture thereof.

Embodiment 7 provides the additive manufacturing method of any one of Embodiments 1-6, wherein the saturant comprises an organic material.

Embodiment 8 provides the additive manufacturing method of Embodiment 7, wherein the organic material comprises a substituted or unsubstituted ($C_1$-$C_{20}$)hydrocarbyl.

Embodiment 9 provides the additive manufacturing method of any one of Embodiments 1-8, wherein the first layer of the first ceramic material, the second layer of the second ceramic material, or both are heated to a temperature in a range of from about 80° C. to about 100° C.

Embodiment 10 provides the additive manufacturing method of any one of Embodiments 1-9, wherein the pressure applied to the first layer of the first ceramic material, the second layer of the second ceramic material, or both, wherein the pressure is in a range of from about 200 MPa to about 500 MPa.

Embodiment 11 provides the additive manufacturing method of any one of Embodiments 1-10, wherein the pressure is applied by a press.

Embodiment 12 provides the additive manufacturing method of any one of Embodiments 1-11, wherein the product has a density in a range of from about 80% to about 95% relative to a corresponding fully densified product.

Embodiment 13 provides the additive manufacturing method of any one of Embodiments 1-12, wherein the method is free of contacting a binder with the first layer of the first ceramic material, the second layer of ceramic material, or both.

Embodiment 14 provides the additive manufacturing method of any one of Embodiments 1-13, wherein the first ceramic material, the second ceramic material, or both are at least partially soluble in water.

Embodiment 15 provides the additive manufacturing method of any one of Embodiments 1-14, wherein the first layer of the first ceramic material, the second layer of the second ceramic material, or both are deposited using an inkjet printer.

Embodiment 16 provides the additive manufacturing method of any one of Embodiments 1-15, wherein the saturant is independently in a range of from about 0.5 wt % to about 50 wt % of the first layer of the first ceramic material, the second layer of the second ceramic material, or both.

Embodiment 17 provides the additive manufacturing method of any one of Embodiments 1-16, wherein the saturant is independently in a range of from about 1 wt % to about 10 wt % of the first layer of the first ceramic material, the second layer of the second ceramic material, or both.

Embodiment 18 provides the additive manufacturing method of any one of Embodiments 1-17, wherein a morphology of individual grains of the first ceramic material and the second ceramic material are substantially the same.

Embodiment 19 provides the additive manufacturing method of any one of Embodiments 1-18, wherein a morphology of individual grains of the first ceramic material and the second ceramic material are substantially different.

Embodiment 20 provides the additive manufacturing method of any one of Embodiments 1-19, wherein a thickness of the first ceramic layer, the second ceramic, or both is independently in a range of from about 100 μm to about 900 μm.

Embodiment 21 provides the additive manufacturing method of any one of Embodiments 1-20, wherein a thickness of the first ceramic layer, the second ceramic, or both is independently in a range of from about 300 μm to about 600 μm.

Embodiment 22 provides the additive manufacturing method of any one of Embodiments 1-21, further comprising rolling the first ceramic layer, the second ceramic layer, or both.

Embodiment 23 provides the additive manufacturing method of any one of Embodiments 1-22, further comprising depositing a third ceramic layer of a third ceramic material to the second ceramic layer.

Embodiment 24 provides the additive manufacturing method of Embodiment 23, wherein the third ceramic layer of the third ceramic material comprises substantially the same ceramic material of the first ceramic material, the second ceramic material, or both.

Embodiment 25 provides a product formed according to the additive manufacturing method of any one of Embodiments 1-24.

Embodiment 26 provides an additive manufacturing product, the product comprising:
  a first layer of a first ceramic material;
  a second layer of a second ceramic material adjacent to the first layer;
  an interface between the first layer and the second layer comprising fused first ceramic material and second ceramic material, wherein a density of the product is in a range of from about 65% to about 100% relative to a corresponding fully densified product.

Embodiment 27 provides the additive manufacturing product of Embodiment 26, wherein the first ceramic material and the second ceramic material independently comprises vanadium oxide, fused aluminium oxide material, heat treated aluminium oxide material, sintered aluminium oxide material, silicon carbide material, titanium diboride, boron carbide, tungsten carbide, titanium carbide, cubic boron nitride, garnet, fused alumina-zirconia, cerium oxide, zirconium oxide, titanium oxide, or mixtures thereof.

Embodiment 28 provides the additive manufacturing product of any one of Embodiments 26 or 27, wherein the first ceramic material and the second ceramic material comprise the same material.

Embodiment 29 provides the additive manufacturing product of any one of Embodiments 26-28, wherein the product has a density in a range of from about 80% to about 95% relative to a corresponding fully densified product.

Embodiment 30 provides the additive manufacturing product of any one of Embodiments 26-29, wherein the method is free of contacting a binder with the first layer of the first ceramic material, the second layer of ceramic material, or both.

Embodiment 31 provides the additive manufacturing product of any one of Embodiments 26-30, wherein a morphology of individual grains of the first ceramic material and the second ceramic material are substantially the same.

Embodiment 32 provides the additive manufacturing product of any one of Embodiments 26-31, wherein a morphology of individual grains of the first ceramic material and the second ceramic material are substantially different.

Embodiment 33 provides the additive manufacturing product of any one of Embodiments 26-32, wherein a thickness of the first ceramic layer, the second ceramic, or both is independently in a range of from about 100 μm to about 900 μm.

Embodiment 34 provides the additive manufacturing product of any one of Embodiments 26-33, wherein a thickness of the first ceramic layer, the second ceramic, or both is independently in a range of from about 300 μm to about 600 μm.

Embodiment 35 provides the additive manufacturing method of any one of Embodiments 1-24, wherein the saturant partially dissolves the printing particles.

Embodiment 36 provides the additive manufacturing method of any one of Embodiments 1-24 or 35, wherein the saturant is evaporative and precipitable.

What is claimed is:
1. An additive manufacturing method, comprising:
  forming a first layer of a first ceramic material with a thickness in the range of 0-500 microns;
  forming a second layer of a second ceramic material with a thickness in the range of 0-500 microns;
  contacting selected regions within the first layer of the first ceramic material, the second layer of the second ceramic material, or both with a saturant, through an inkjet printhead, independently in a range of from about 1 wt % to about 10 wt % of the first ceramic material and the second ceramic material, wherein the selected regions comprises less than 100% of the first or second layer;
  applying pressure to the first layer of the first ceramic material, the second layer of the second ceramic material, or both, wherein the pressure is in a range of from about 10 kPa to about 800 MPa;

heating the first layer of the first ceramic material, the second layer of the second ceramic material, or both to a temperature in a range of from about 50° C. to about 300° C.;

at least partially dissolving a portion of an external surface of a ceramic particle of the first layer of the first ceramic material, the second layer of the second ceramic material, or both, using the saturant;

fusing a portion of the dissolved portion of the external surface of the ceramic particle as the saturant evaporates to form a product having a density in a range of from about 65% to about 100% relative to corresponding fully densified product.

2. The additive manufacturing method of claim 1, wherein the first ceramic material and the second ceramic material independently comprises vanadium oxide, fused aluminium oxide material, heat treated aluminium oxide material, sintered aluminium oxide material, silicon carbide material, titanium diboride, boron carbide, tungsten carbide, titanium carbide, cubic boron nitride, garnet, fused alumina-zirconia, cerium oxide, zirconium oxide, titanium oxide, silica, barium titanate, calcium phosphate, or mixtures thereof.

3. The additive manufacturing method of claim 1, wherein the first layer of the first ceramic material, the second layer of the second ceramic material, or both are heated to a temperature in a range of from about 50° C. to about 200° C.

4. The additive manufacturing method of claim 1, wherein the pressure applied to the first layer of the first ceramic material, the second layer of the second ceramic material, or both, wherein the pressure applied to the first layer of the first ceramic material, the second layer of the second ceramic material, or both is in a range of from about 10 kPa to about 700 MPa.

5. The additive manufacturing method of claim 1, wherein the pressure is applied by a pressing piston.

6. The additive manufacturing method of claim 1, wherein the product has a density in a range of from about 80% to about 95% relative to a corresponding fully densified product.

7. The additive manufacturing method of claim 1, wherein the method is free of contacting a binder with the first layer of the first ceramic material, the second layer of ceramic material, or both.

8. The additive manufacturing method of claim 1, wherein the saturant comprises water.

9. The additive manufacturing method of claim 8, wherein the saturant further comprises glycerine, lactam, glycol, or a mixture thereof.

10. The additive manufacturing method of claim 1, wherein the saturant comprises an organic material.

11. The additive manufacturing method of claim 10, wherein the organic material comprises a substituted or unsubstituted ($C_1$-$C_{20}$)hydrocarbyl.

* * * * *